April 14, 1931. J. J. SCHLOSSER 1,800,757
CREAM AND ICE CREAM MIX FILTER
Filed Jan. 19, 1929 2 Sheets-Sheet 2
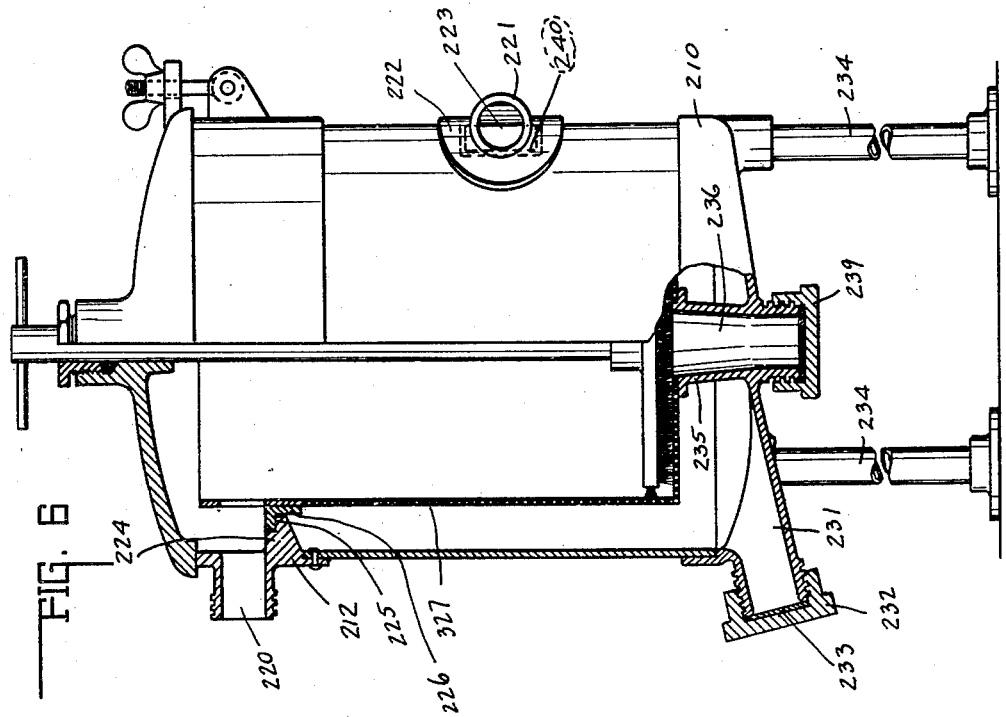
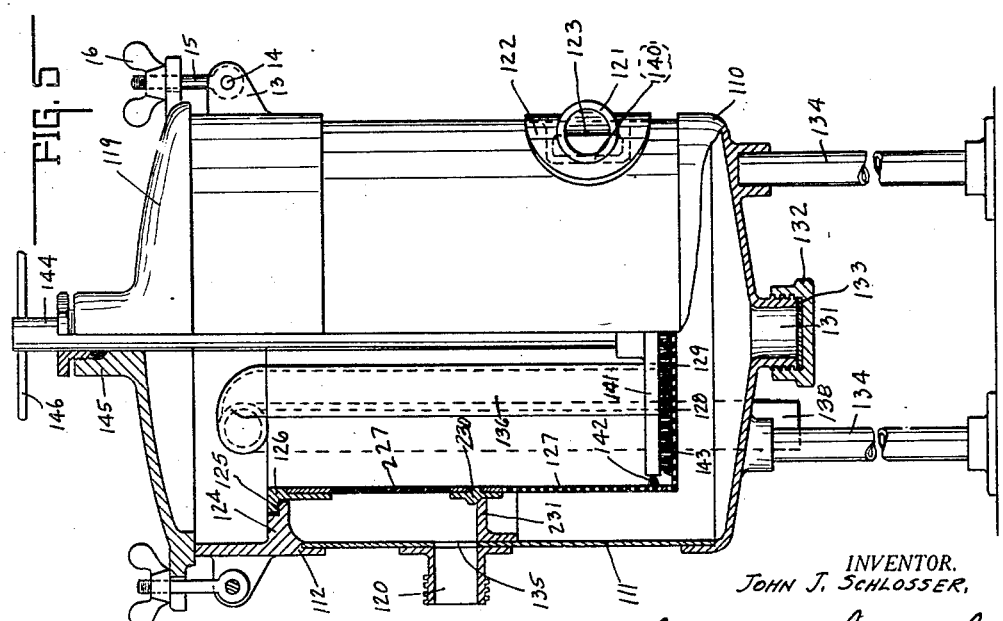
INVENTOR.
JOHN J. SCHLOSSER,
BY
ATTORNEYS.

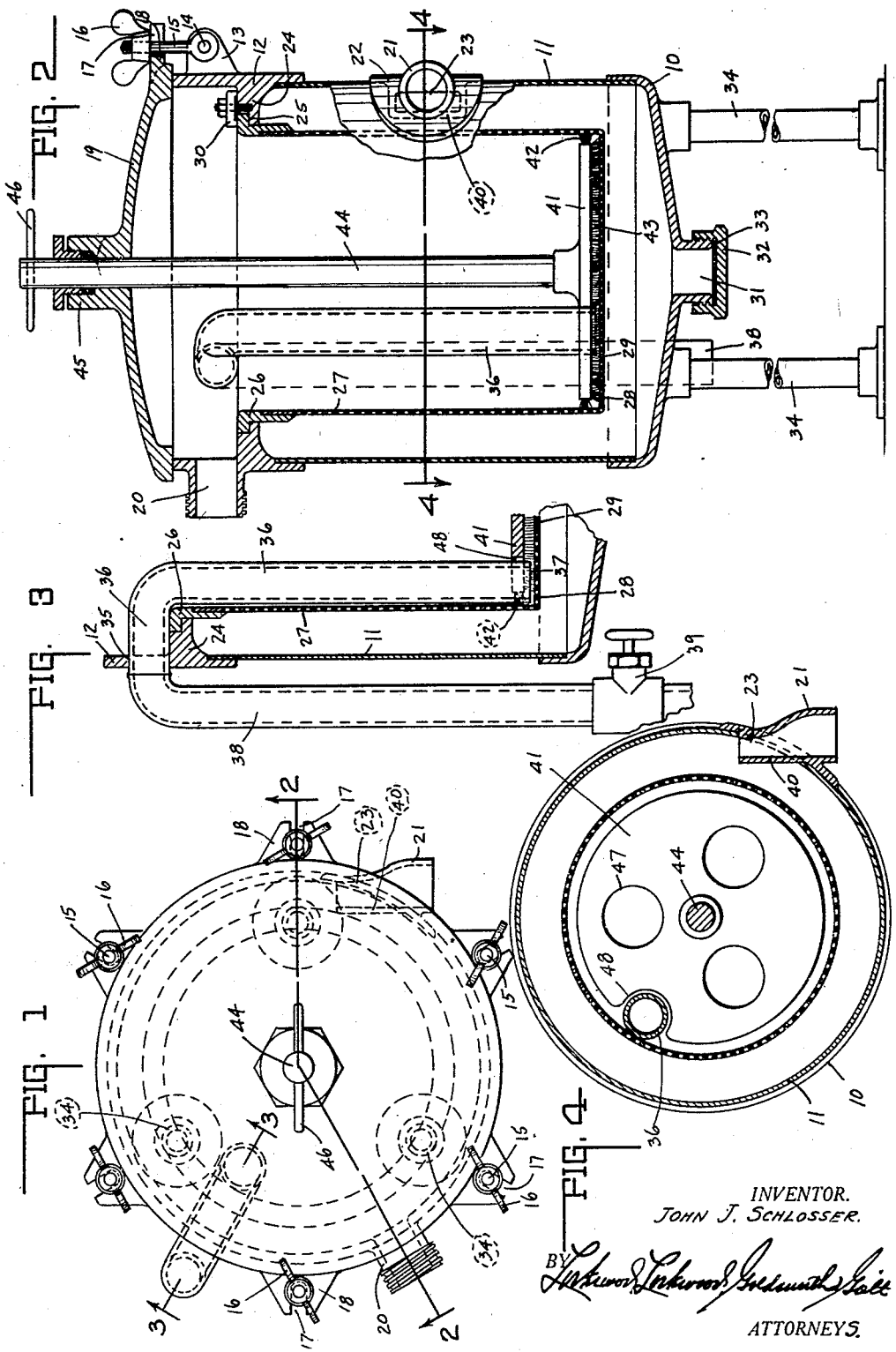

Patented Apr. 14, 1931

1,800,757

UNITED STATES PATENT OFFICE

JOHN J. SCHLOSSER, OF FRANKFORT, INDIANA

CREAM AND ICE-CREAM MIX FILTER

Application filed January 19, 1929. Serial No. 333,567.

This invention relates to a cream filter which is particularly adaptable for use with sour cream and ice cream mix.

The chief object of the invention is to remove curds, scale and foreign matter from the cream, which has been pasteurized prior to subsequent utilization or from ice cream mix or other relatively viscous liquids.

One feature of the invention consists in the accomplishment of the foregoing object by a cream filter which, in addition to separating out the dirt and scale as well as the large curds from the cream, has the property of breaking up the smaller curds.

The construction of the device is such that suitable capacity can be obtained by the passing of cream under pressure through the filter and the passing of the cream into and through the filter in such a manner that the strainer is substantially self-cleaning.

Another feature of the invention consists in the provision of means for cleaning the straining surface. The device is also adapted for cleaning by reverse flow operation.

The full nature of the invention will be more clearly understood from the accompanying drawings and the following description and claims.

Fig. 1 is a top plan view of one form of the invention. Fig. 2 is a longitudinal central section with the inlet shown in elevation. Fig. 3 is a longitudinal sectional view taken on the line 3—3 of Fig 1 and in the direction of the arrows, the siphon being shown in elevation. Fig. 4 is a transverse section taken on the line 4—4 of Fig. 2. Fig. 5 is a longitudinal central section of a modified form of the cream separator, a part thereof being shown in elevation. Fig. 6 is a view similar to Fig. 5 and of a still further modified form of the invention.

In the drawings 10 indicates a base or bowl to which is secured a cylinder or outer shell 11 and mounted thereon is a head casting 12 having ears 13 arranged in pairs and in spaced relation to mounting pivots 14 carrying the pressure clamping bolts 15 which are associated with the wing nuts 16, said bolts extending through the slot 17 of an adjacent pair of ears 18 carried by the cover 19, whereby the cover 19 may be clampingly mounted upon the head 12. The head 12 includes an outlet 20 positioned upon the opposite side from an inlet 21. The inlet 21 is positioned about midway between the top and the bottom of the cylinder 11 and is secured thereto by the bracket or gasket plate construction 22. As shown in Fig. 2, the orifice or inlet is substantially rectangular.

Extending inwardly from the head 12 is a flange 24 having an annular seat 25 which receives an annular collar 26 that is secured to the upper end of a perforated cylindrical screen 27, the lower end being secured to a bottom 28 which, in the present form of the invention, is shown perforated as at 29 to form an additional screening surface. The screen 27 has small perforations therein. The clamps 30 suitably secure the cylindrical screen construction within the cylinder 11 and the casing and maintain the neck or collar 26 and flange 24 of the head 12 in leakproof connection.

The base or bowl 10 includes an outlet opening 31 for drainage, closed by a cap and gasket 32 and 33, respectively. The base or bowl 10 is supported by suitable standards 34. Extending through the head 12 at 35 is an L-shaped pipe 36 which has an open mouth 37 terminating near the bottom 29 of the screen. The L-shaped pipe communicates with an exterior pipe 38 controlled by a discharge valve 39. The pipes 36 and 38 together constitute a siphon for draining the inner cylinder or screen when it is desired to remove the contents to sterilize the device.

In general, the cream filter is connected to a discharge line from the pasteurizers and generally the machinery for handling cream includes one or more forewarmers, each of which is adapted to discharge to a pasteurizer, the discharge being accomplished by pumps. In general the cream is discharged in a warm condition from the forewarmer and is brought to about 160 degrees from the first pasteurizer. The second pasteurizer increases the temperatue to between 185 and 190 degrees. Beyond that temperature the cream will scorch and become unsatisfactory for butter.

In small butter factories a single flash pasteurizer is employed with a forewarmer. In either instance the temperature of the liquid will remain sufficiently high upon and after admission to the filter so that additional pasteurization will be obtained in the filter without subjection to additional heat.

During the pasteurization of the cream it is often necessary to make short stops between runs or when a change from one forewarmer to another is required and if the temperature of the stationary cream gets too high, it scorches and scales on the pasteurizer. Dirt in the cream, scale in the cream, and hard curds, all are unsuitable for making clean and pure butter. The present device is included between the pasteurizers and the coolers and the hot pasteurized cream is pumped into the filter forming the invention and is pumped from the filter to and through the coolers for the subsequent making of butter.

In order to protect the screen 27 from excessive pressure, the inlet 23 by means of the plate 40 which constitutes a baffle, discharges the cream tangentially into the annular chamber formed between cylinder 11 and the cylindrical screen 27. This swirling action or admission of the cream causes the smaller curds to dissolve or break up and pass with the larger portion of the cream through the openings in the screen 27 and openings 29 in the bottom, if the latter are provided, and into the inner chamber, from whence it is discharged from the outlet 20. This increases the over-run, and therefore the material loss is reduced and plant efficiency is increased.

The ruggedness of construction of the filter also permits its employment in high pressure as well as gravity fed lines and also permits handling of heavy cream at low temperatures when it is very viscous.

The larger curds, dirt and scale, collect upon the outside of the cylindrical screen 27 and by reason of the swirling action of the incoming cream. The material filtered out of the cream gradually passes down along the screen and collects in the bottom until such time as the sufficient amount is collected therein to necessitate the removal of the cap 31. During such times as the pasteurizers are not discharging, reverse flow of the cream can be employed to open the openings in the screen 27 and the openings 29 in the bottom, if desired. This is rather unusual procedure but will normally prevent clogging.

It is sufficient in most cases to reciprocate up and down in the cylinder 27 a cylindrical brush 41 having the bristles 42 which will clean the openings in the screen 27. If the bottom 28 includes openings 29, the base of the brush 41 is provided with bristles 43. The brush back 41 is mounted on the stem 44 which extends through the cover 19 through a packing construction and gland 45 and the stem is provided at its outer free end with a hand engageable portion 46. During such times as the pasteurizer is not discharging into the filter the brush may be reciprocated or, if desired, the brush may slowly reciprocate even while the cream is being filtered. The reciprocation of the brush will clean the openings and prevent clogging thereof.

To permit the minimum disturbance of the filtered cream by reason of the reciprocation of the brush, the back is provided with a suitable number of openings 47 which provide for passage of the cream through the brush back. Also the brush back is cut away at 48 to clear the siphon construction 36. Reciprocation of the plunger, when there is no pressure on the cream inside of the filter, causes a slight circulation of the cream in the filter and the bristle action together with such circulation generally is sufficient to loosen particles clinging to the outside of the filter. These are precipitated therefrom and collect at the bottom in the base or bowl. When a particularly long run of operation occurs, this accumulation in the base of the bowl may be drawn off without entirely draining the machine. This draining also will cause a reverse flow of the cream through the screen openings which will further clean the latter. The material drained from the outlet 31 can then be screened by hand and substantially all of the desirable butter fat recovered. However, as a general rule, it has been found that the residue which collects on the bottom adjacent the outlet 31 in the base of the bowl consists solely of dirt and scale.

The chief reason why butter factories do not screen or filter their cream is because this operation removes too much of the butter fat with the dirt and scale formed in pasteurizing. Also, to reduce the formation of scale to a minimum, lower temperatures and longer heatings are resorted to which reduces volume production. If desired, the back of the brush 41 may have the bristles omitted and may snugly fit the cylinder. In this way, a plunger effect may be obtained which will cause sufficient churning when reciprocating to clear the perforations in the screen.

A modified form of the invention is shown in Fig. 5 and in this form the inlet is positioned near the lower portion of the tank or cylinder 111 and the same is indicated as at 121, the inlet opening as at 123 and the plate as at 122. The base 110 includes the usual discharge or drain opening 131 and the head 112 supports the cover 119 in the usual manner, said cover providing the gland construction 145 for slidably supporting rod 144 carrying the brush 141 having bristles 142 and 143, rod 144 on its exposed end carrying the hand portion 146. The construction is supported by the usual standards 134. The outlet, in this form of the invention, is not provided in the head 112 but is provided in the cylinder casing 110, said outlet is indicated by the numeral 120 and the opening 135 is provided in said casing for such purpose. The screening cylinder in this instance, is shown provided with a bottom 128, having perforations 129 and the cylindrical body portion 127 includes an upper finer screen 227, the two being united by a combination peripheral band and seating member 230. The annular chamber formed between the cylinder 127 and casing 111 is laterally divided by a partition 231, thereby forming two superposed annular chambers, one being the intake chamber and the other being the outlet or discharge chamber.

The neck 126 of the inner filter construction is seatable at 125 in the collar or seat 124 of the casing. The outlet 120 is at substantially the lowest portion of the superposed annular chamber and, therefore, opening of the valve controlling this outlet will permit draining of the upper annular chamber. Opening the drain 131 permits draining of the lower chamber. The usual siphon shown in Fig. 3 is also provided but not illustrated herein and will drain the entire screen chamber.

From the foregoing, the operation is obvious. Hot cream is pumped from the pasteurizers to the inlet 123 and the deflecting wall 140 causes it to assume a swirling action in the lower chamber. Cream is drawn through the opening 123 into the swirling chamber and thence is drawn through the the coarse and fine screens 227 into the upper annular chamber from whence it is discharged by the outlet 120.

The device, therefore, has but few moving parts, is susceptible of ready dismantling for cleaning, occupies but little space, and can operate continuously, if necessary, and is adaptable for continuous operation, as well as batch operation. All the parts are likewise so arranged that ready access can be had thereto for sterilizing the same.

In Fig. 6 a further form of the invention is illustrated. It includes similar parts bearing similar numerals of the two hundred series. The siphon construction may be employed if desired. However, the drain 236 provided accomplishes the same result and also centers and seals the lower end of the screen 327.

The outlet 236 in the present form is also intended to serve as the discharge of the filter. In this event the flange 212 including the outlet 220 is omitted or reduced to a very small collar which supports the clamps 15 in turn supporting the cover and maintaining the screen in spaced relation. With this arrangement the flow of liquid through the filter is as follows:

The liquid enters at 221 hits the baffle 240 and is given a circuitous and tangential action through the annular outer chamber. The cream is drawn through the filter screen and then discharges through the drain 236. The cap 239 in this construction is omitted and suitable piping is connected thereto.

The invention claimed is:

1. A filter including an upright cylindrical screen having an open end and a closed but perforated bottom for increasing screening area, a casing in spaced relation therewith, a lateral partition in said casing and engaging said screen and dividing the same into two successive screening surfaces, said partition and said screen forming two superposed annular chambers within said casing, an inlet to one chamber, an outlet from the other chamber, and a movably mounted member adapted to engage the entire screening surface for cleaning the same.

2. A device as defined by claim 1 characterized by the addition of a drain for the casing and a siphon for draining the screen interior.

3. A filter including an upright cylindrical screen, said screen including a substantially open end and a substantially closed end, a casing in spaced relation therewith, a lateral partition in said casing and engaging said screen and dividing the same into two screens, one being of finer mesh than the other, said partition and said screen forming two superposed annular chambers within the casing, an inlet discharging into one of said chambers formed between the casing and the screen, an outlet communicating with the other chamber similarly formed, a drain for the first mentioned chamber, and a siphon for draining the screen interior.

4. A filter including an upright cylindrical screen, including a perforated closed lower end, a casing in spaced relation therewith, an inlet discharging through the casing into the space between the same and the screen, said discharge being substantially tangential of the screen, an outlet for the contents of the screen interior, a substantially circular screen engaging cleaning member arranged for closed end and side wall cleaning, and means extending without the casing for reciprocating and rotating said member for cleaning the closed end and the cylindrical side wall of the screen.

In witness whereof, I have hereunto affixed my signature.

JOHN J. SCHLOSSER.